(12) United States Patent
Lettis et al.

(10) Patent No.: US 8,579,444 B2
(45) Date of Patent: Nov. 12, 2013

(54) MODULAR REAR VIEW MIRROR AND METHOD TO ASSEMBLE IT

(75) Inventors: Andrew Lettis, Chichester (GB); Charlie Spencer, Portsmouth (GB); Richard Gould, Portsmouth (GB)

(73) Assignee: SMR Patents S.a.r.l., Luxembourg (LU)

( * ) Notice: Subject to any disclaimer, the term of this patent is extended or adjusted under 35 U.S.C. 154(b) by 461 days.

(21) Appl. No.: 12/783,528

(22) Filed: May 19, 2010

(65) Prior Publication Data

US 2010/0296189 A1 Nov. 25, 2010

(30) Foreign Application Priority Data

May 19, 2009 (EP) .................................... 09160611

(51) Int. Cl.
*G02B 7/182* (2006.01)
*B60R 1/06* (2006.01)

(52) U.S. Cl.
USPC ........ 359/871; 359/872; 359/900; 248/475.1; 248/221.12; 248/223.31; 248/222.52; 248/224.8; 248/222.41; 248/225.21

(58) Field of Classification Search
USPC ............. 359/871, 872, 900; 248/223.31, 477, 248/481, 221.11, 221.12, 222.51, 222.52, 248/223.41, 224.51, 224.61, 224.8, 222.41, 248/225.21, 475.1
See application file for complete search history.

(56) References Cited

U.S. PATENT DOCUMENTS

| | | | | |
|---|---|---|---|---|
| 3,096,061 A * | 7/1963 | Bertell | ......................... | 248/481 |
| 4,488,778 A * | 12/1984 | Polzer et al. | .................. | 359/871 |
| 4,678,295 A * | 7/1987 | Fisher | ........................... | 359/874 |
| 4,877,214 A * | 10/1989 | Toshiaki et al. | ............... | 248/483 |
| 4,998,814 A * | 3/1991 | Perry | ............................. | 359/871 |
| 5,245,480 A * | 9/1993 | Polzer | ........................... | 359/841 |
| 5,355,255 A * | 10/1994 | Assinder | ........................ | 359/871 |
| 5,721,646 A * | 2/1998 | Catlin et al. | .................. | 359/865 |
| 6,347,872 B1 * | 2/2002 | Brechbill et al. | ............. | 359/879 |
| 6,840,639 B2 * | 1/2005 | Zadro | ............................ | 359/855 |
| 6,961,195 B2 * | 11/2005 | Inagaki | ......................... | 359/871 |
| 7,033,033 B2 * | 4/2006 | Ishigami | ....................... | 359/872 |
| 7,048,393 B2 * | 5/2006 | Sugiyama | ..................... | 359/871 |
| 7,448,589 B2 | 11/2008 | Blakeman et al. | | |

FOREIGN PATENT DOCUMENTS

| | | |
|---|---|---|
| DE | 19830173 | 1/2000 |
| EP | 0614783 | 9/1994 |
| GB | 1202646 | 8/1970 |
| GB | 1459101 | 12/1976 |

OTHER PUBLICATIONS

European Search Report for Application No. 09160611-1523 dated Oct. 21, 2009.

* cited by examiner

*Primary Examiner* — Ricky D Shafer
(74) *Attorney, Agent, or Firm* — Reising Ethington PC (57) ABSTRACT

The invention is related to a rear view mirror assembly with a least two parts out of the group of part as: mirror frame, mirror base, mirror housing, mirror bezel, mirror glass, mirror lighting means, actuator, that must be connected during assembly process with at least one retention latch. This retention latch comprises a circular hood and a rectangular arm formed in a first part and to be inserted into an opening and shifted along a slot in a second part.

9 Claims, 9 Drawing Sheets

MODULAR REAR VIEW MIRROR AND METHOD TO ASSEMBLE IT

The invention is based on a priority patent application EP09160611.1 which is hereby incorporated by reference.

FIELD OF THE INVENTION

The invention is related to an external rear view mirror assembly comprising components that allows a modular concept to install a rear view mirror. The components are produced to fit together using special and adapted retention latches. More particularly, the invention is related to method to assemble a rear view mirror in a few steps.

DESCRIPTION OF THE RELATED ART

External mirror assemblies are ubiquitous for contemporary motor vehicles and have long been used to aid the driver in operating the vehicle, especially in improving the rearward view of the driver. Selected components of the mirror assemblies must be connected during the assembly process. For example, a tilt actuator assembly used to adjust the mirror to provide a proper field of view is typically mounted in a rigid frame within the mirror assembly housing and is operably connected to a reflective element. The rigid frame is typically mounted within the mirror assembly housing to provide structural support to the housing and connecting the mirror assembly to the vehicle. The various connections are typically made with threaded fasteners, such as screws. The fasteners are separate components which an assembler must select in the proper number and properly install in order to correctly assemble the mirror.

At times, the correct number of fasteners may not be installed. Also, the fasteners may not be tightened to the proper torque, thereby loosening over time so that the mirror assembly no longer operates satisfactorily. The failure to install the correct number of fasteners or to tighten the fasteners to the proper torque requires a costly replacement of the affected part(s) and can contribute to a reduction in vehicle safety due to operational failure of the mirror assembly.

One aspect, the invention relates to an improved vehicular mirror assembly comprising a mirror bracket adapted to be mounted to a vehicle; a mirror housing mounted to the base and comprising a rearwardly-facing opening; a reflective element mounted within the mirror housing in register with the rearwardly-facing opening; a tilt actuator mounted to at least one of the mirror housing and the bracket, and to the reflective element for tiltably actuating the reflective element.

In related art as U.S. Pat. No. 7,448,589, a solution is disclosed that comprises: a snap-fit assembly for interconnecting selected components of a vehicular mirror assembly, the components comprising a mirror housing, a mounting frame having at least one of a first mounting aperture. The snap-fit assembly comprises a first mounting stud with a first portion having a first diameter and a second portion having a second diameter smaller than the first diameter. The second portion is adapted for snap fit communication with the first mounting aperture and the first portion is adapted for supporting communication with the mounting frame.

The snap fit solution according prior art connects support frame and mirror housing using several connectors to fix the components. The snap fit means have circular bodies more with conical internal faces, that are not easy to produce. In addition the reliability and the exact position definition is not optimized in this prior art.

The objective of the invention is to provide an easy connection that can replace several separate connecting means in prior art and to ease assembly of a rear view mirror. An advantage of the intentional solution is that connector can be easily formed and used for the modular system at least to mount a bezel. The inventive connector assembly allows a highly flexible and efficient assembly and gives a customer the freedom of design whilst conforming to the quality standards as required.

Another advantage of the solution is the cost saving aspect. A modular system allows the standardized production of mirror basic components and an easy replacement of them during assembly. Variations can be realized for the customer.

A further advantage of the solution is the use of the inventive snap fit connection for all components of a rear view mirror. For the connection is reliable and strong, the invention is only limited by the material and the spring coefficient of the materials.

SUMMARY OF THE INVENTION

The invention is shown in the figures and shortly described there after.

DETAILED DESCRIPTION OF THE PREFERRED EMBODIMENTS

Figure 1:
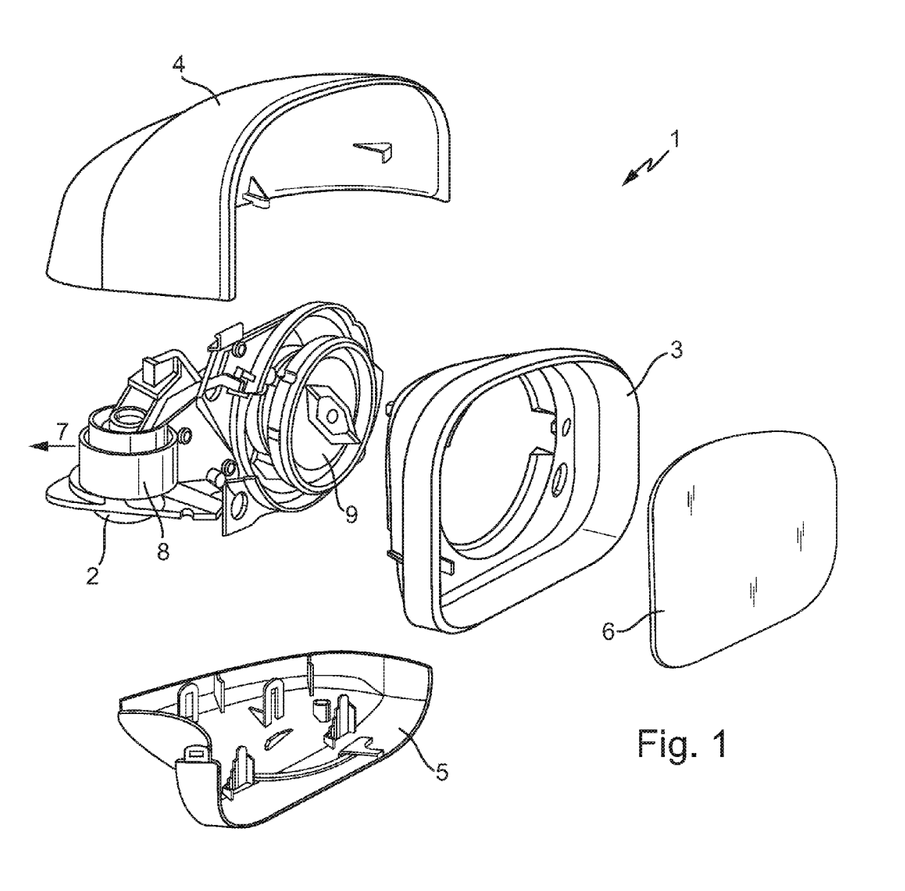
FIG. 1 shows a modular rear view mirror.

FIG. 1 shows a schematic view of one example of a rear view mirror assembly 1. The mirror assembly 1 is mounted in a conventional fashion via a mirror base 7 to a motor vehicle, which is not shown in the figure. The mirror assembly 1 includes an upper mirror housing 4 and a lower mirror housing 5. The central device is a mirror frame 2 which is pivotal connected to the mirror base. The pivot axis is referenced with 8 in the figure. As a stable support the mirror frame 2 bears a glass actuator 9 and a mirror glass 6. A mirror bezel 3 is connected to the mirror frame 2.

The modular rear view mirror assembly 1 is installed step by step. The support elements of the rear view mirror as mirror base 7 and mirror frame 2 are preinstalled and can be mounted on the motor vehicle at this stage. The frame 2 is afterward equipped with the mirror bezel 3 and the covers of the mirror housing, in the example the upper and the lower housing 4, 5. The actuator 9 and the mirror glass are assembled in addition.

The next figures and the description explain the connection of mirror frame 2 and mirror bezel 3 via retention latches, as connector parts 10. These retention latches are according FIG. 2c arranged at the extreme positions of a mirror frame 2. The positions are circularly oriented and give the mirror head, with frame 2 and bezel 3, a structural rigidity at the extreme points. It is not mandatory that the points are arranged on a circle with one radius, but the center point must be the same.

To optimize the connection the retention latches are arranged with 120 degrees nominal spacing in between.

Figure 2A:
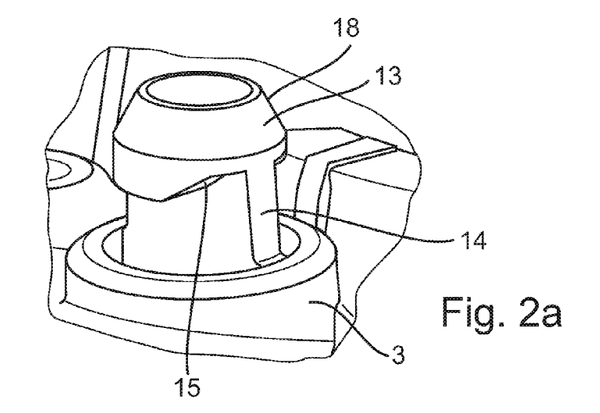
FIG. 2a shows one part of connector (bezel)

FIG. 2a shows one part of the inventive connection, item 10 injection moulded in one piece with the mirror bezel. The connection is a retention latch with a retention latch hood 13. This retention latch hood 13 has a sloped surface 18, which helps locating the hood into an opening 19 of the connector's counterpart.

Figure 5:
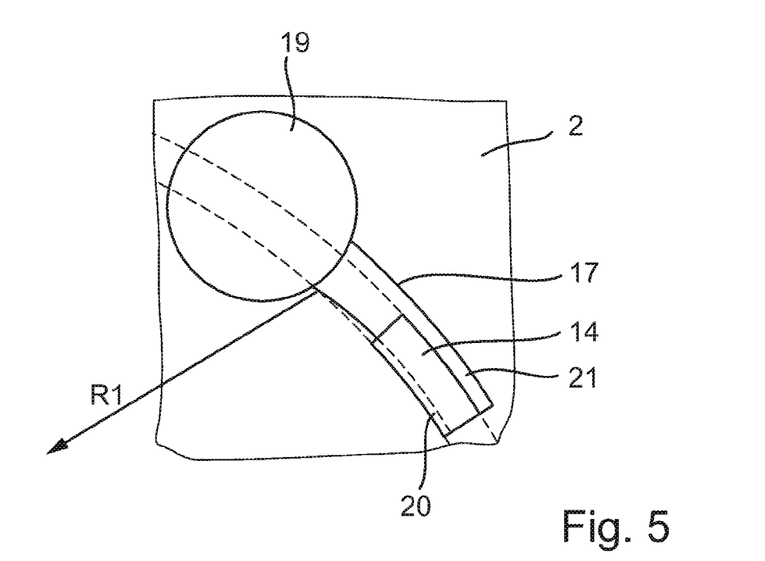
FIG. 5 shows the retention latch arm.

The retention latch hood 13 sits on the top of a retention latch arm 14, this has an approximately oblong cross section. The retention latch arm cross section, is slightly curved along a radius R1 as is shown in FIG. 5. The radius R1 is also used to curve the slot of the connector counterpart. A chamfer 15 at the bottom of the hood 13 helps to locate and lead the connector parts together.

Figure 2B:
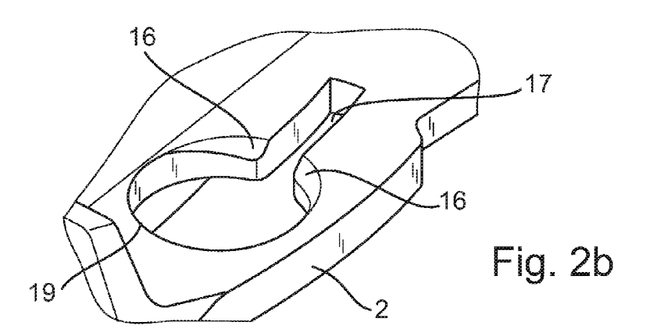
FIG. 2b shows the second part of connector.
Figure 2C:
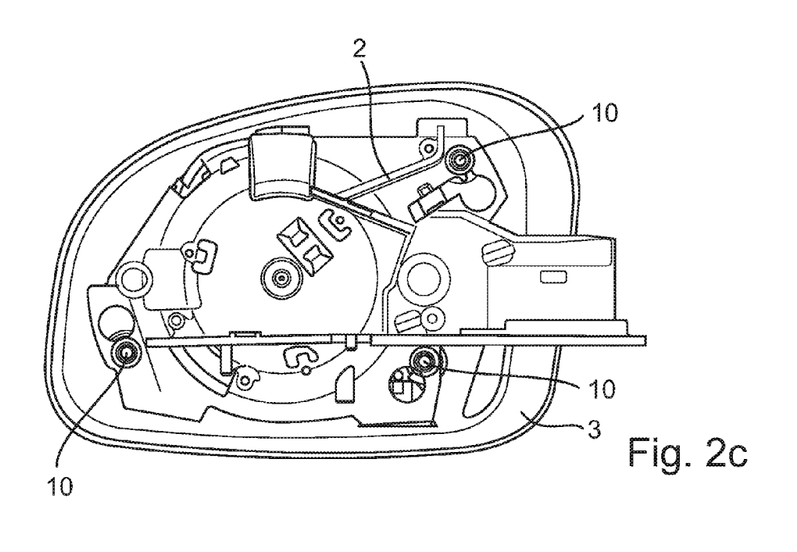
FIG. 2c shows a frame—bezel connected part.

FIG. 2b shows the counterpart of the connector 10 in the mirror frame 2. The connector has a circular opening 19 and chamfer 16 at the leading edge of a slot 17.

Figure 3A:
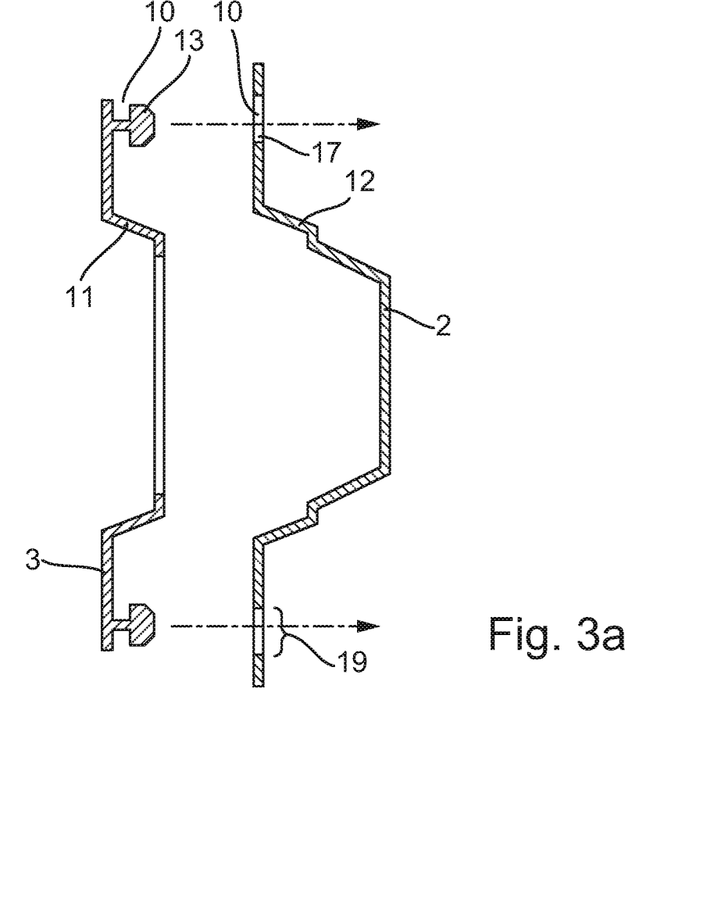
FIG. 3a shows a schematic connection.

FIG. 3a shows in a schematic way, how the mirror frame and the mirror bezel are connected. The bezel 3 is pressed/located into the frame 2. The retention latch hoods 13 are pressed through the openings 19 of the frame 2. After being inserted the mirror bezel is rotated around the center point. This results in a move of the retention latch hood 13 along the slot 17 of the mirror frame 2 as described in FIG. 3b.

Figure 3B:
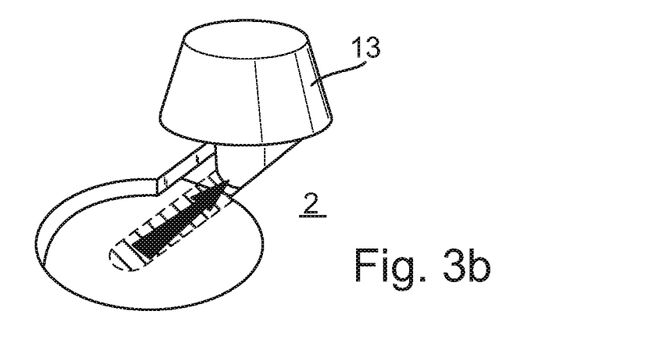
FIG. 3b shows a connected retention latch.

The bezel 3 comprises a conical bearing surface 11 which has a counterpart in a conical bearing surface 12 of the mirror frame 2.

Figure 4A:
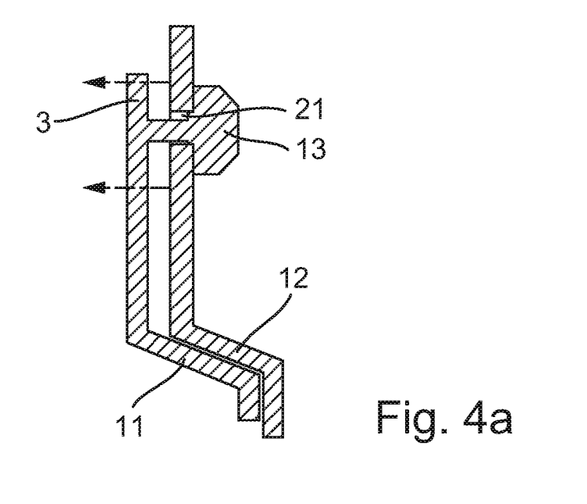
FIG. 4a shows the connection.

The positioning of the slots 17 gives a flexibility in frame and allows the designed interference 20 to improve retention as seen in FIG. 4a or FIG. 5. In FIG. 5 a cross section through the connector 10 shows the opening 19 and the curved slot 17. In the slot 17 the cross section of the retention latch arm 14 is visible. The retention latch arm 14 has interference 20 at the inner radius wall of the slot 17 and a clearance 21 at the outside wall of the slot. This design ensures contact between frame and bezel on all latches.

Figure 4B:
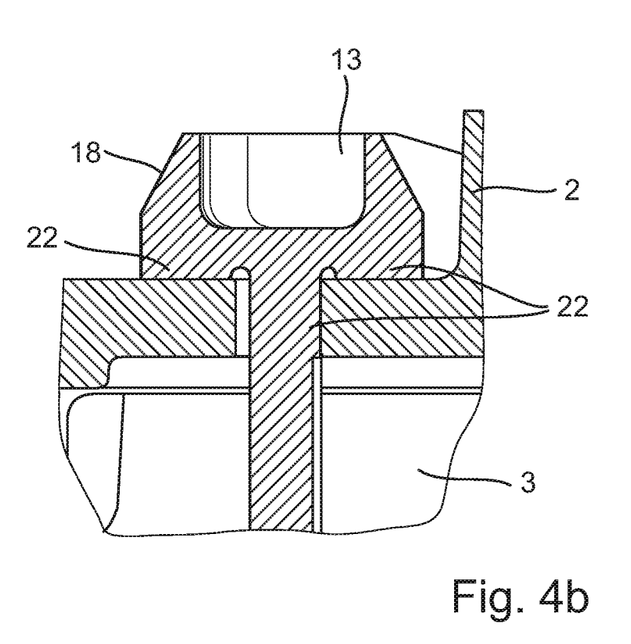
FIG. 4b shows the retention latch with contact areas.

FIG. 4b presents a cross section through the connector length. The retention latch hook sits at its final position on the mirror frame surface. Two contact areas 22 are located on this surface. The third contact area 22 is due to the interference 20 of the retention latch arm located at the side wall of the slot 17. The large contact areas prevent the retention latch to move.

FIG. 5 is a cross section along the frame 2. The frame 2 has an opening 19 and a slot 17 to receive the retention latch hood. The slot 17 is slightly curved with a Radius R1. When the retention latch hood is inserted the arm 14 of the retention latch, faces an interference area 20 and a clearance area 21.

Figure 6:
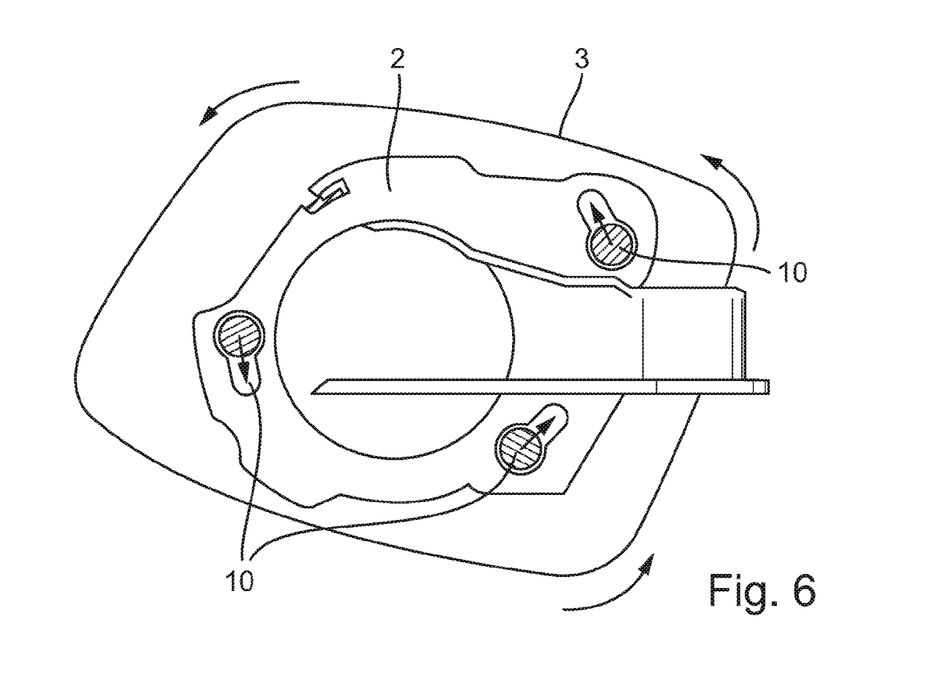
FIG. 6 shows the motion during assembly.

FIG. 6 describes the move of the mirror bezel versus the installed mirror frame when the connection 10 is inserted. After the retention latch hood is inserted into the openings 19 of the mirror frame 2, the next step is a rotation, as marked by arrows around a center point of the mirror frame and bezel, to slide the retention latch arms along the slot inner walls.

The connection according the invention can be improved, where space is limited, by using additional connection means to support a rigid fixture of bezel at the mirror frame.

Figures 7A, 7B:
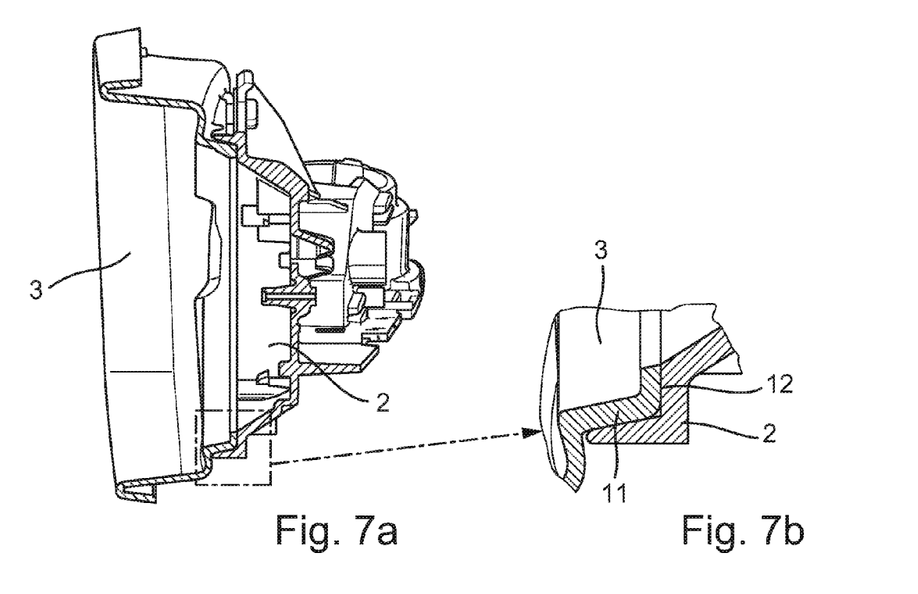
FIGS. 7a to 7c show the bearing faces.
Figure 7C:
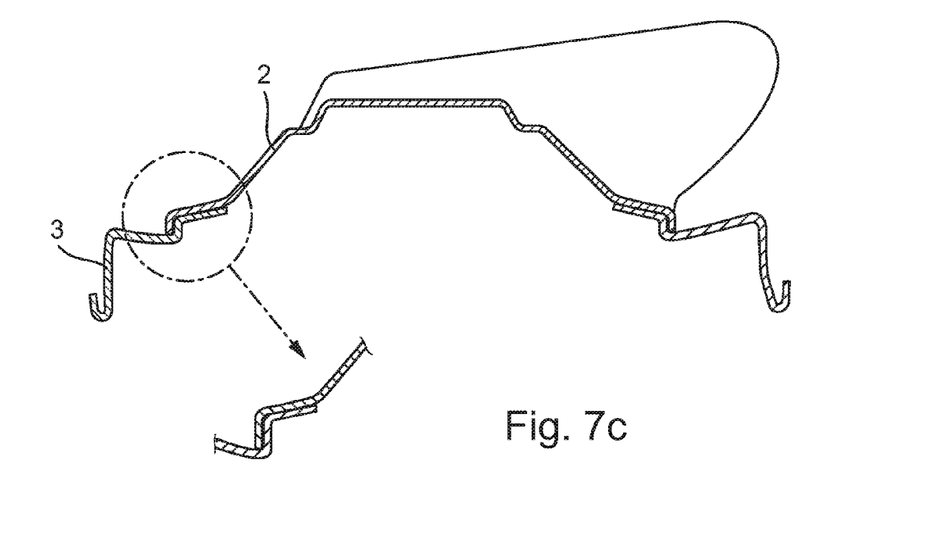

FIG. 7a to FIG. 7c show an embodiment of the invention using adapted bearing faces. The cup-in-cup design allows an easy and full-proof location of the two parts. The conical bearing surface 11 of the bezel 3 is adapted to follow the cup form of the conical bearing surface 12 of the frame 2.

Figure 8A:
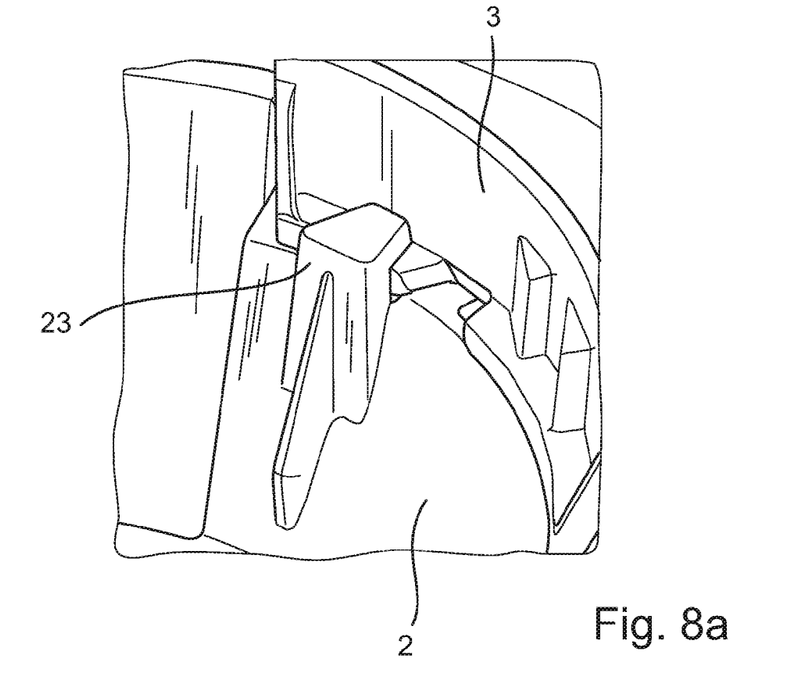
FIGS. 8a and b show a hook.
Figure 8B:
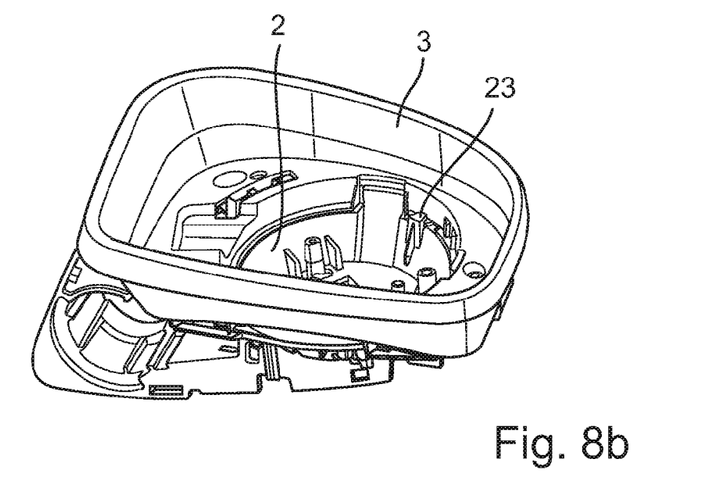

Additionally, to improve the connection between mirror frame 2 and bezel 3 where packaging space is restricted, the use of a retention hook/latch 23 can be incorporated, as is shown in FIGS. 8a and 8b. The hook/latch 23 is designed to provide increased localized retention, where needed. The mirror frame 2, formed of plastic material PBT, includes a hook that entraps the bezel 3 during the rotation assembly.

Figure 9:
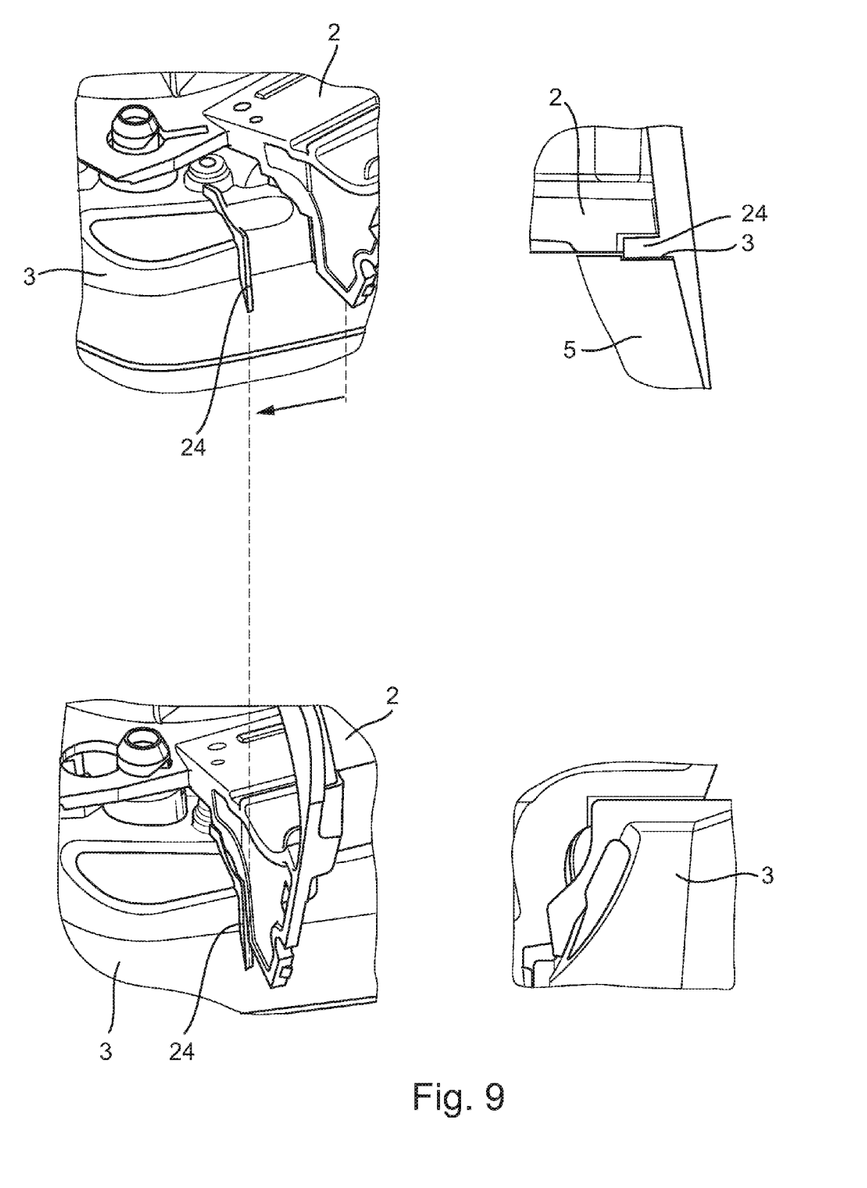
FIG. 9 shows the stop face.

Referring to FIG. 9, a further measure to improve retention is a frame/bezel stop. The stop rib 24 is formed in the bezel 3. The mirror frame 2 forms a counterpart, so when the retention latches are connected, the rotation of the bezel against the frame ends at this rib 24.

Finally, the assembled frame 2, shown in FIG. 9, (top side right), is fixed with the assembly of the lower housing; this traps the frame 2 between the bezel 3 and the lower housing part 5.

Figure 10A:
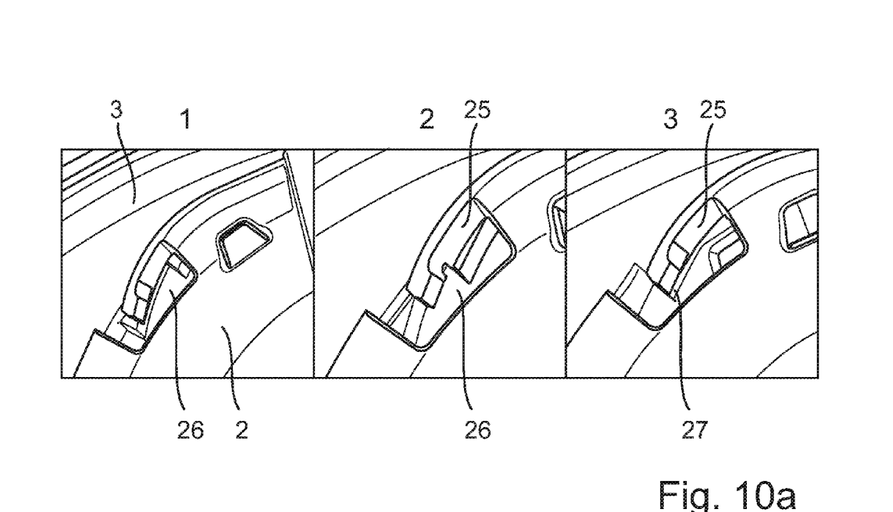
FIGS. 10a and b show a cam clip
Figure 10B:
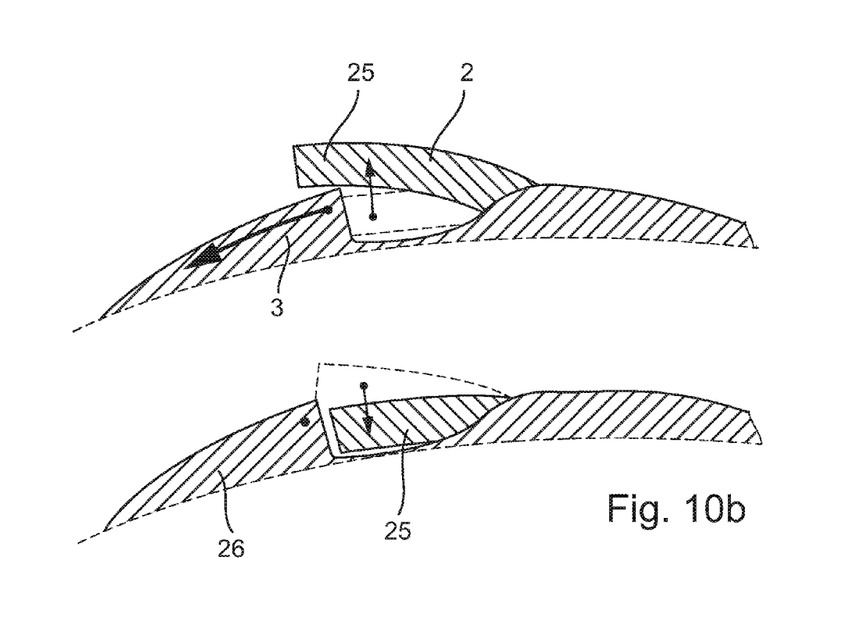

In addition, the final position after rotation is fixed with an additional cam clip 25 according to FIGS. 10a and 10b. FIG. 10a shows the actions of the cam clip in stages. Stage one is the initial location of the retention latch hood into the mirror frame. In this step the cam clip 25 is in clearance. The cam clip 25 consists of a guide 26, attached to the mirror frame's edge.

Stage two shows the situation during the rotation around the arrow, wherein the guide 26 (attached to the bezel 3) is rotated around a radius. The clip is ramped easily out of the way of rotation.

In stage three the clip is locked into place at the edge of mirror frame 2 into a notch 27 of the mirror bezel 3.

The invention solution to assemble a rear view mirror at the vehicle uses, first step, the retention latch structures and a rotation around the center of the component to fix the connection and a stop to define the final position of the components versus each others.

Despite the fact that the embodiment described above is related to a connection between a mirror bezel and a mirror frame, the invention can be used to mount other components of the rear view mirror assembly.

The only restriction is that the components must have a design that allows the insert of the retention latch hood and the circular move of one of the component against the other.

A group of components could be installed and fixed according the invention: as: mirror frame (2), mirror base (7), mirror housing (4,5), mirror bezel (3), mirror glass (6), mirror lighting means (30), glass actuator (9), glass (6) camera modules, pivot/power fold actuators.

The lighting means comprises turn signal indicator, security lights, IR lighting for assistant systems, day running light, warning lights.

LEGEND

1. Mirror Assembly
2. Frame
3. Bezel
4. Upper Housing
5. Lower Housing
6. Glass
7. Mirror Base
8. Pivotal Axis
9. Actuator
10. Connector Parts
11. Conical Bearing Surface Bezel
12. Conical Bearing Surface Frame
13. Retentional Latch Hood
14. Retentional Latch Arm
15. Chamfer 1 at Hood
16. Chamfer 2 at Slot
17. Slot
18. Sloped Phase
19. Circular Opening
20. Interference
21. Clearance 22. Contact Area
23. Frame Hook
24. Frame Bezel Stop
25. Cam Clip
26. Clip guide
27. Notch

We claim:

1. A rear view mirror assembly comprising:
   a mirror frame, said mirror frame including a circular opening with an adjacent slot, wherein said slot is curved with said curve being defined by a radius of curvature;
   a mirror housing secured to said mirror frame;
   a mirror bezel secured to said mirror housing;
   a mirror glass operatively secured to said mirror frame;
   a retention latch fixedly secured to said mirror bezel and having a circular hood with sloped faces mounted on top of a rectangular arm, said retention latch inserted into said circular opening and shifted along said adjacent slot, wherein each of said mirror frame and said mirror bezel include complementing conical bearing faces to support retention and provide a rotational axis for assembly.

2. Rear view mirror assembly according claim 1 characterized in that a plurality of said retention latches are arranged circularly around a center point of said mirror bezel.

3. Rear view mirror assembly according claim 1 characterized in that the retention latch hood has a chamfer.

4. Rear view mirror assembly according claim 1 characterized in that the opening has a second chamfer.

5. Rear view mirror assembly according claim 1 characterized in that the retention latch arm has an interference at an inner wall of the slot and a clearance at an outer side wall of the slot.

6. Rear view mirror assembly according claim 1 characterized that further fixation hooks and clips are mounted to at least said mirror frame.

7. Process to assemble a rear view mirror according claim 1 characterized by the steps:
   a) inserting retention latch hoods of said mirror bezel into openings of said mirror frame;
   b) rotating said mirror bezel with respect to said mirror frame; and
   c) stopping rotation at a bezel stop.

8. Process according claim 7 with the step:
   d) fixing of said mirror bezel to said mirror frame by at least one additional hook.

9. Process according claim 7 with the step:
   e) fixing said mirror bezel to said mirror frame by a cam clip.

* * * * *